United States Patent [19]

Brouwer et al.

[11] 4,095,901

[45] Jun. 20, 1978

[54] ALIGNMENT APPARATUS FOR ROLLING MILL ROLLER GUIDES

[75] Inventors: Willem Brouwer, Lexington; Richard J. Reardon, Boylston, both of Mass.

[73] Assignee: Morgan Construction Company, Worcester, Mass.

[21] Appl. No.: 781,581

[22] Filed: Mar. 28, 1977

[51] Int. Cl.² .................... G01B 11/27; G01B 11/26; B21C 51/00

[52] U.S. Cl. ........................................ 356/153; 72/37; 356/154

[58] Field of Search ................ 356/138, 150, 153–154, 356/172, 247, 253–255; 72/37; 33/286

[56] References Cited

U.S. PATENT DOCUMENTS 3,457,018  1/1969  Kloss .................................. 356/153

*Primary Examiner*—John K. Corbin
*Assistant Examiner*—Wm. H. Punter

*Attorney, Agent, or Firm*—Thompson, Birch, Gauthier & Samuels

[57] ABSTRACT

An apparatus for observing the relative alignment of two pairs of guide rollers on a rolling mill roller guide. The roller guide is positioned with its guide roller pairs spaced along an axis extending between two light sources. A dichroic mirror is arranged between each pair of guide rollers and its adjacent light source. One dichroic mirror reflects blue light while transmitting red light, and the other dichroic mirror reflects red light while transmitting blue light. The light reflected from both dichroic mirrors is recombined by a third dichroic mirror and is then projected onto a screen as red and blue images which may be compared visually with a reference outline on the screen, the said outline being representative of proper guide roller alignment. When the roller pairs are properly aligned, the red and blue images coincide on the screen to produce a white image aligned with the reference outline.

9 Claims, 6 Drawing Figures

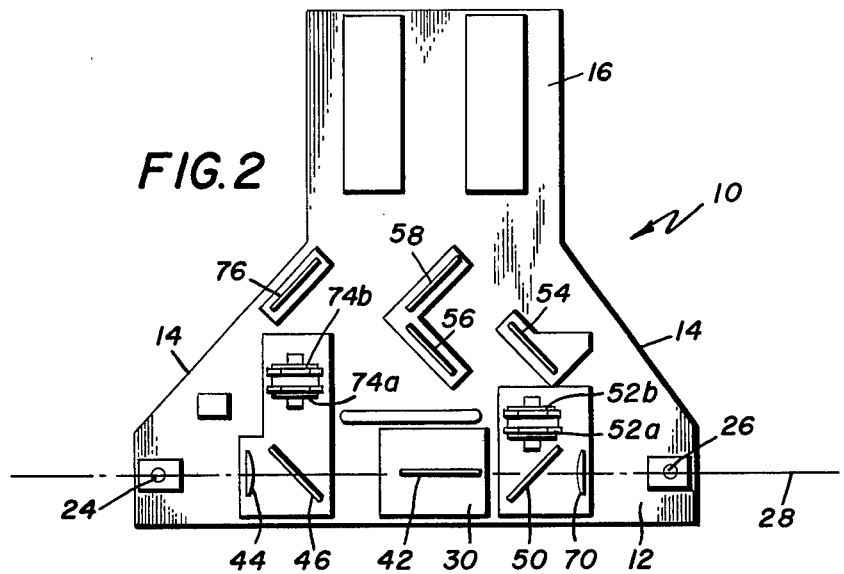
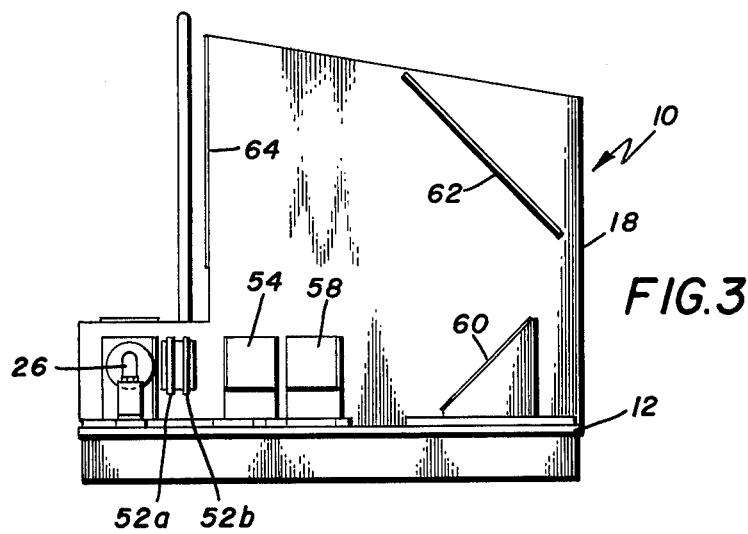

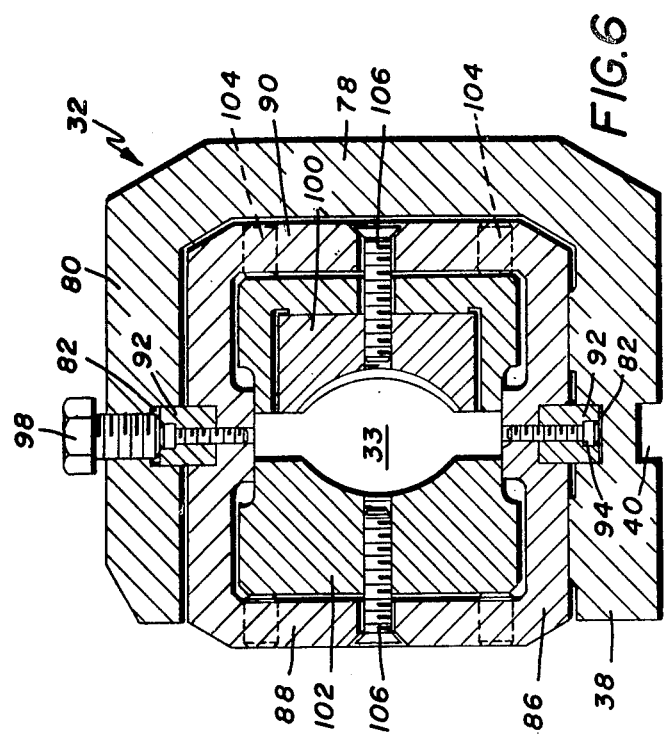
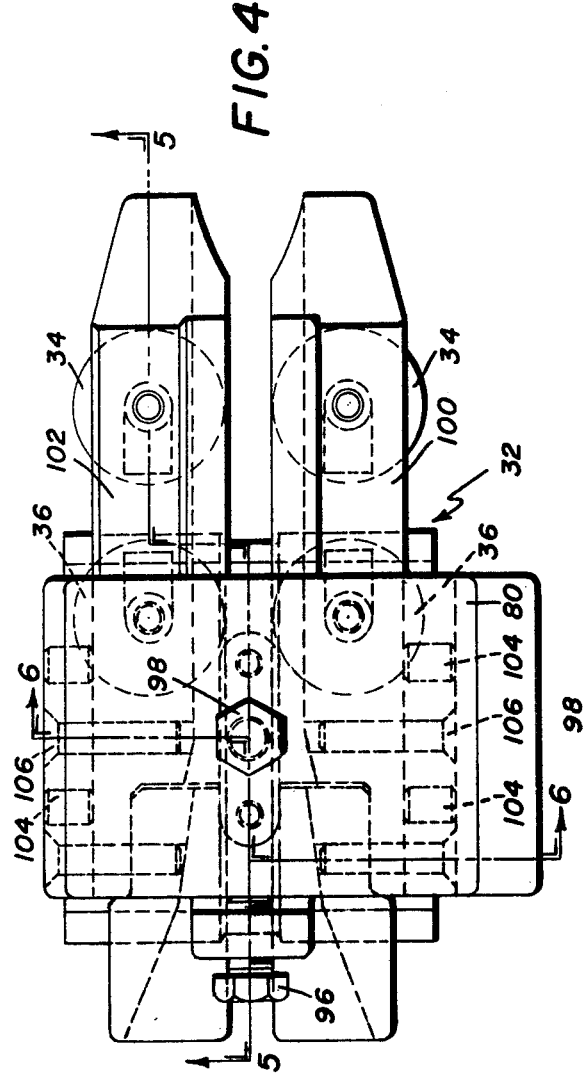
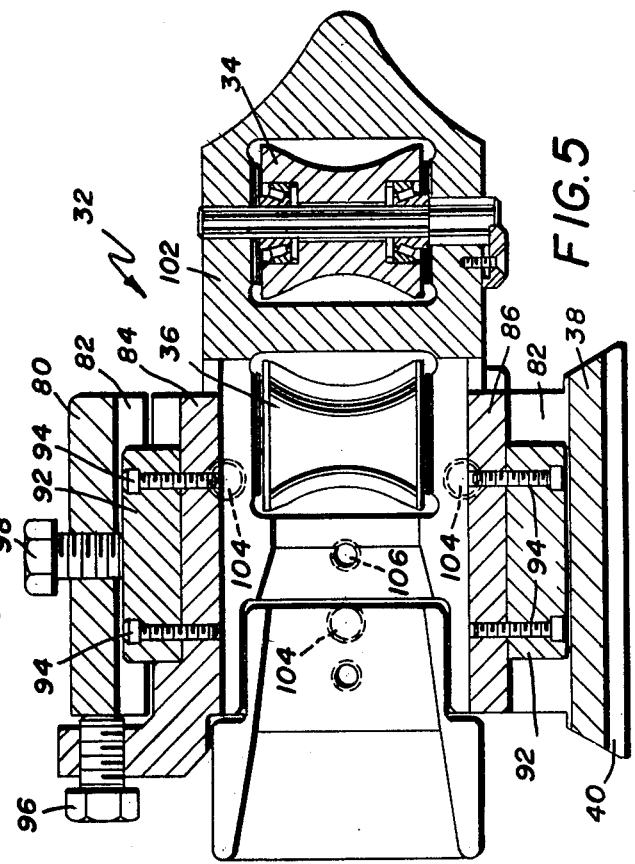

ALIGNMENT APPARATUS FOR ROLLING MILL ROLLER GUIDES

DESCRIPTION OF THE INVENTION

This invention relates generally to optical devices, and in particular to an improved optical device for visually aligning two pairs of guide rollers on a rolling mill roller guide.

With roller guides of the type which employ two pairs of guide rollers, one pair must be aligned accurately with the other pair along the mill pass line. Otherwise, the product will be improperly guided, and the guide rollers and their respective bearings are likely to wear more rapidly than normal. In the past, the task of aligning multiple pairs of guide rollers has been time consuming and in many instances, results have been less than optimum.

It is accordingly a general object of the present invention to provide an improved apparatus for visually aligning two pairs of guide rollers on a rolling mill roller guide.

A further object of the present invention is the provision of an apparatus of the above-mentioned type which provides a positive and visually recognizable indication of proper guide roller alignment, thereby reducing the time required for making guide adjustments while also improving the accuracy of such adjustments.

These and other objects and advantages of the present invention will become more apparent as the description proceeds with the aid of the accompanying drawings, wherein:

FIG. 2 is a schematic horizontal sectional view of the apparatus shown in FIG. 1;

FIG. 3 is a schematic side view of the same apparatus;

Figure 1:
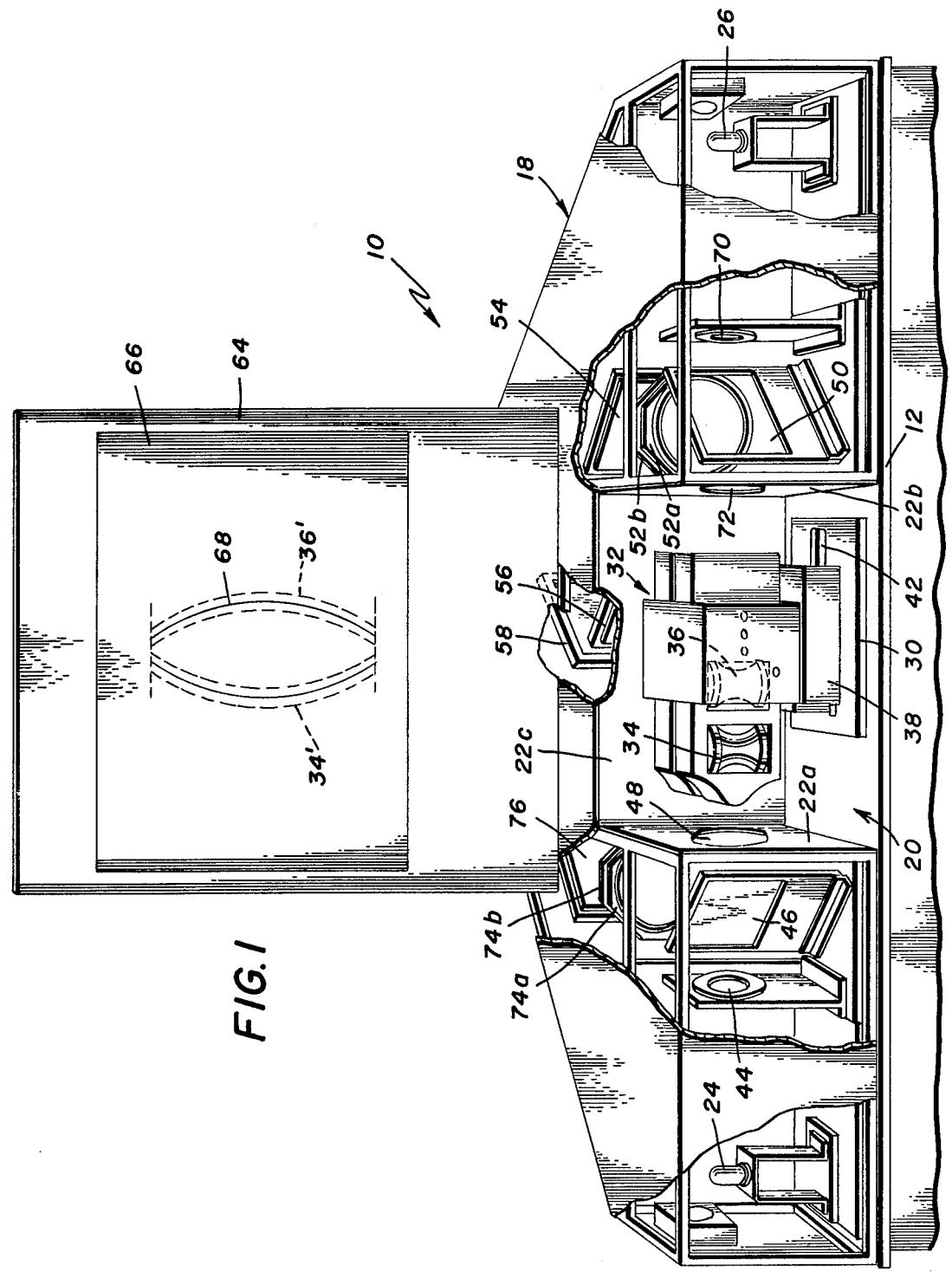
FIG. 1 is a front perspective view of an apparatus embodying the concepts of the present invention, with portions of the housing broken away in order to better illustrate the arrangement of interior components.

FIG. 4 is a horizontal plan view of a typical roller guide of the type having two pairs of guide rollers which may be aligned by employing the apparatus of the present invention; and, FIGS. 5 and 6 are sectional views on lines 5—5 and 6—6 of FIG. 4.

Referring now to FIGS. 1-3, there is generally indicated at 10 an apparatus embodying the concepts of the present invention. The apparatus includes a base 12 having a relatively wide front portion which tapers inwardly and rearwardly as at 14, with a somewhat narrower generally rectangular rear section 16. A housing generally depicted at 18 is carried on the base 12. The front of the housing is indented to form an open central area 20. Area 20 is defined by opposed side walls 22a, 22b and a back wall 22c.

Two light sources, which may conveniently comprise incandescent bulbs 24, 26, are contained in the housing 18 on opposite sides of the open central area 20. For purposes of discussion, and as depicted in FIG. 2, the light sources 24, 26 will be considered as being spaced along an imaginary axis 28.

A mounting plate 30 is carried on the base 12 within the open central area 20. The plate 30 serves as the means for locating a conventional roller guide generally depicted at 32. The roller guide is of the type having two pairs of guide rollers 34, 36. Typically, the roller guide has a base 38 with a slot 40 therein which is adapted to be keyed on a key 42 on the mounting plate 30. The key 42 underlies and is in vertical alignment with the axis 28.

Light rays from bulb 24 pass through a condensor lens 44 which collimates the light rays received at a dichroic mirror 46. The mirror 46 is of the type which transmits one colored light, for example blue, while reflecting another colored light, for example red. The transmitted blue light continues through an opening 48 in the side wall 22a and through the guide passageway 33 (see FIG. 6) of guide 32. The transmitted blue light then arrives at a second dichroic mirror 50. Mirror 50 is of the type which transmits red light while reflecting blue light. Accordingly, the blue light transmitted by mirror 46 is reflected by mirror 50 away from the axis 28 and through a first doublet combination of aligned lens 52a, 52b. Thereafter, the blue light is reflected by mirror 54 to another mirror 56, and from mirror 56 through a dichroic mirror 58 which is of the same type as dichroic mirror 46. After passing through dichroic mirror 58, the blue light continues to mirror 60 where it is reflected upwardly to another mirror 62. From mirror 62, the blue light rays are received on a translucent screen 64 which extends vertically upwardly from the housing 18 and is thus easily viewable from the front of the apparatus. A translucent template 66 is affixed to the screen 64. Template 66 carries a reference outline 68 which is representative of proper guide roller alignment. The blue light rays received on screen 64 produce an enlarged blue image of the adjacent portions of guide rollers 34 (shown in an improperly aligned condition by dotted lines at 34' in FIG. 1).

Light from the other bulb 26 is likewise passed through a condensor lens 70 which collimates the light rays arriving at the dichroic mirror 50. Dichroic mirror transmits red light rays which continue through an opening 72 in side wall 22b, through guide passageway 33 of roller guide 32, thereafter continuing through opening 48 to arrive at dichroic mirror 46. This mirror reflects the red light rays through a second doublet combination of aligned lens 74a, 74b to a mirror 76. From mirror 76, the red light rays are reflected to the dichroic mirror 58 which in turn further reflects the red light rays onto the mirror 60. From here, the red light rays are reflected upwardly to mirror 62 and then forwardly onto the screen 64 where they provide a red image of the second pair of guide rollers 36 (shown in an improperly aligned condition by dot-dash lines at 36' in FIG. 1).

It will thus be seen that the light rays reflected by dichroic mirrors 46 and 50 are in effect recombined by a third dichroic mirror 58 before being projected onto the screen 64. Mirror 58 is identical to mirror 46.

At least one of the pairs of doublet lens 52a, 52b and 74a, 74b are adjustable in order to equalize the optical distance between the screen 64 and planes which extend transversely to the axis 28 and which contain the rotational axes of each pair of guide rollers 34, 36.

Assuming that the guide rollers 34, 36 are in misalignment as indicated diagrammatically at 34', 36' in FIG. 1, it will be necessary to make adjustments to the roller guide 32 before it can be placed into operation. The manner of making such adjustments will now be explained with reference in particular to FIGS. 4–6 where it will be seen that the roller guide 32 includes an exterior guide box formed in part by the base 38, a side wall 78 and a top wall 80. The opposed inner surfaces of the base 38 and top wall 80 are longitudinally grooved as at 82. A guide insert having a top wall 84, a bottom wall 86, and side walls 88, 90 is suitably dimensioned for insertion into the guide box. The exterior surfaces of the top and bottom walls 84, 86 are suitably grooved to receive keys 92 held in place therein by screws 94. The keys 92 are received in the grooves 82 of the guide box to thereby provide a means of locating the guide insert therein. An adjustable bolt 96 provides the means for controlling the extent to which the insert is pushed into the guide box, and another adjustable bolt 98 provides the means for fixing the insert in place.

A pair of laterally spaced arms 100, 102 extend through the insert. Each arm rotatably supports a guide roller 34 and a guide roller 36. The spacing between the arms 100, 102 and the guide rollers carried thereon defines the guide passageway 33. Each of the arms 100, 102 is adjustable laterally with relation to the other arm by the cooperative action of set screws 104 and retaining screws 106. When a lateral adjustment of one of the arms 100 or 102 is required, the set screws 104 and the retaining screws 106 are appropriately adjusted either by backing off the set screws 104 and tightening the retaining screws 106, or by backing off the retaining screws 106 and tightening the set screws 104.

Such adjustments will cause the guide rollers to shift laterally, and this shifting can be observed on the screen 64. When the guide rollers 34, 36 are properly aligned, the projected blue and red images 34', 36' will coincide to produce a single white image in alignment with the reference outline 68 on the template 66. When this condition is reached, the guide rollers 34, 36 are properly adjusted and the guide assembly 32 is ready to be placed into operation.

It will thus be seen that the present invention provides a means of visually observing the relative alignment of two pairs of guide rollers on a roller guide in a manner which greatly facilitates the task of roller alignment. This is accomplished by projecting enlarged different-colored images of each pair of guide rollers onto the translucent screen 64 and by visually observing the aforesaid projected images in relation to an enlarged outline 68 representative of the condition which exists when the guide rollers are in proper alignment.

It is our intention to cover all changes and modifications to the embodiment herein chosen for purposes of disclosure which do not depart from the spirit and scope of the invention.

We claim:

1. Apparatus for observing the relative alignment of two pairs of guide rollers on a rolling mill roller guide, comprising: first and second light sources; means for mounting the roller guide in a position such that the two pairs of guide rollers are spaced along an axis extending between said light sources; a first dichroic mirror arranged along said axis between said first light source and one of the pairs of guide rollers, a second dichroic mirror arranged along said axis between said second light source and the other of the pairs of guide rollers, each of said dichroic mirrors having the capacity to transmit different colored light, with the light transmitted by one dichroic mirror being reflected by the other dichroic mirror away from said axis; a screen remote from said axis; and projection means for projecting the light reflected by each of said dichroic mirrors onto said screen to thereby produce different colored images of each of the pairs of guide rollers.

2. The apparatus of claim 1 wherein said projection means includes a third dichroic mirror for recombining the light reflected by said first and second dichroic mirrors.

3. The apparatus of claim 2 wherein said third dichroic mirror is identical to said first dichroic mirror.

4. The apparatus of claim 1 further comprising means for providing a reference outline of properly aligned guide rollers on said screen.

5. The apparatus of claim 4 wherein said first dichroic mirror is of the type which transmits red light while reflecting blue light, and wherein said second dichroic mirror is of the type which transmits blue light while reflecting red light.

6. The apparatus of claim 5 wherein the red and blue images projected onto said screen coincide to produce a white image aligned with said reference outline when the two pairs of guide rollers are properly adjusted and aligned in the direction of said axis.

7. Apparatus for visually aligning first and second pairs of guide rollers on a rolling mill roller guide, comprising: first and second light sources spaced along an axis; means for supporting the roller guide between said light sources with said pairs of guide rollers spaced along said axis; a first dichroic mirror positioned between said first light source and said first pair of guide rollers, said first dichroic mirror being capable of transmitting red light while reflecting blue light; a second dichroic mirror positioned between said second light source and said second pair of guide rollers, said second dichroic mirror being capable of transmitting blue light while reflecting red light; a screen remote from said support means; a first transmitting means for projecting the blue light reflected by said first dichroic mirror onto said screen to produce a blue light image of the second pair of guide rollers; and, a second transmitting means for projecting the red light image reflected by said second dichroic mirror onto said screen to produce a red light image of said first pair of guide rollers, whereupon when the pairs of guide rollers are aligned in the direction of said axis, the red and blue light images projected on said screen will coincide to produce a white image.

8. The apparatus of claim 7 wherein said first and second transmitting means includes pairs of lens with means for adjusting at least one of said pairs in order to equalize the optical distance between said screen and planes which extend transversely to said axis and which contain the rotational axes of each pair of said guide rollers.

9. The apparatus of claim 7 further comprising condensor lens between each of said light sources and said support means.

* * * * *